(12) United States Patent
Djordjevic et al.

(10) Patent No.: US 8,660,205 B2
(45) Date of Patent: Feb. 25, 2014

(54) ENERGY EFFICIENT CONSTELLATION METHOD AND SYSTEM

(75) Inventors: Ivan B. Djordjevic, Princeton, NJ (US); Lei Xu, Princeton, NJ (US); Ting Wang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 81 days.

(21) Appl. No.: 13/487,246

(22) Filed: Jun. 3, 2012

(65) Prior Publication Data

US 2012/0307933 A1 Dec. 6, 2012

Related U.S. Application Data

(60) Provisional application No. 61/492,976, filed on Jun. 3, 2011.

(51) Int. Cl.
*H04L 27/00* (2006.01)
(52) U.S. Cl.
USPC ........... 375/295; 375/302; 375/303; 375/308; 455/110; 370/483

(58) Field of Classification Search
None
See application file for complete search history.

(56) References Cited

U.S. PATENT DOCUMENTS

2009/0296853 A1* 12/2009 Doong et al. ................. 375/296

\* cited by examiner

*Primary Examiner* — Adolf Dsouza
(74) *Attorney, Agent, or Firm* — Jeffery Brosemer; Joseph Kolodka

(57) ABSTRACT

A method and apparatus employing statistical physics energy minimization methods to signal constellation design. By using statistical physics concepts, an energy-efficient signal constellation design algorithm (EE-SCDA) is described. In the presence of amplified spontaneous emission (ASE) noise and channel impairments, we use EE-SCDA to determine a source distribution, and represent the signal constellation design as a center of mass problem. Furthermore a discrete-time implementation of D-dimensional transceiver as well as corresponding EE polarization-division multiplexed (PDM) system is described.

1 Claim, 6 Drawing Sheets

ENERGY EFFICIENT CONSTELLATION METHOD AND SYSTEM

CROSS REFERENCE TO RELATED APPLICATION

This application claims the benefit of U.S. Provisional Patent Application Ser. No. 61/492,976 filed Jun. 3, 2011 which is incorporated by reference as if set forth at length herein.

TECHNICAL FIELD

This disclosure relates generally to the field of telecommunications and in particular to methods and systems for the generation of energy efficient signal constellations.

BACKGROUND

Given the ever-increasing capacity demands made on communications networks, network designers have employed higher symbol rates. However, as operating symbol rates increase, deteriorating effects such as fiber nonlinearities and polarization mode dispersion inhibit communications over optical fiber. Accordingly, modulation formats exhibiting high spectral efficiencies have been employed in an attempt to mitigate such deteriorating effects. Notwithstanding improvements afforded by such efficient formats, methods and apparatus that provide an increased energy efficiency would represent a significant advance in the art.

SUMMARY

An advance in the art is made according to an aspect of the present disclosure directed to methods and apparatus that employ statistical physics methods to improve the energy efficiency of signal constellations. By using statistical physics concepts we describe and employ an energy-efficient signal constellation design algorithm (EE-SCDA). Advantageously, and in the absence of noise, a preferred distribution generally follows a Gibbs-Boltzman distribution. In the presence of amplified spontaneous emission (ASE) noise and other channel impairments, the EE-SCDA method is used to determine a preferred source distribution and the signal constellation is represented as a center mass problem. Advantageously, methods and apparatus according to the present disclosure—when combined with large-girth, low-density parity check (LDPC) codes, significantly outperform conventional LDPC-coded polarization-division multiplexed (PDM) quadrature amplitude modulation (QAM) techniques.

In an exemplary embodiment, a discrete-time implementation of a D-dimensional transceiver as well as corresponding energy efficient (EE) polarization division multiplexed (PDM) system.

These exemplary embodiments are demonstrated— through the use of Monte Carlo simulations—that our method and apparatus employing these statistical physics techniques significantly outperform traditional PDM coded schemes.

BRIEF DESCRIPTION OF THE DRAWING

A more complete understanding of the present disclosure may be realized by reference to the accompanying drawings in which:

FIG. 2(a) is a schematic diagram depicting a DT D-dimensional modulator according to an aspect of the present disclosure; FIG. 2(b) is a schematic diagram depicting a DT D-dimensional demodulator according to an aspect of the present disclosure; FIG. 2(c) is a schematic diagram depicting a transmitter according to an aspect of the present disclosure; and FIG. 2(d) is a schematic diagram depicting a receiver according to an aspect of the present disclosure; wherein $T_s$ denotes the symbol duration, and T is the sampling interval, related to $T_s$ by $T=T_s/U$, where U is the oversampling factor.

DETAILED DESCRIPTION

Figure 1:
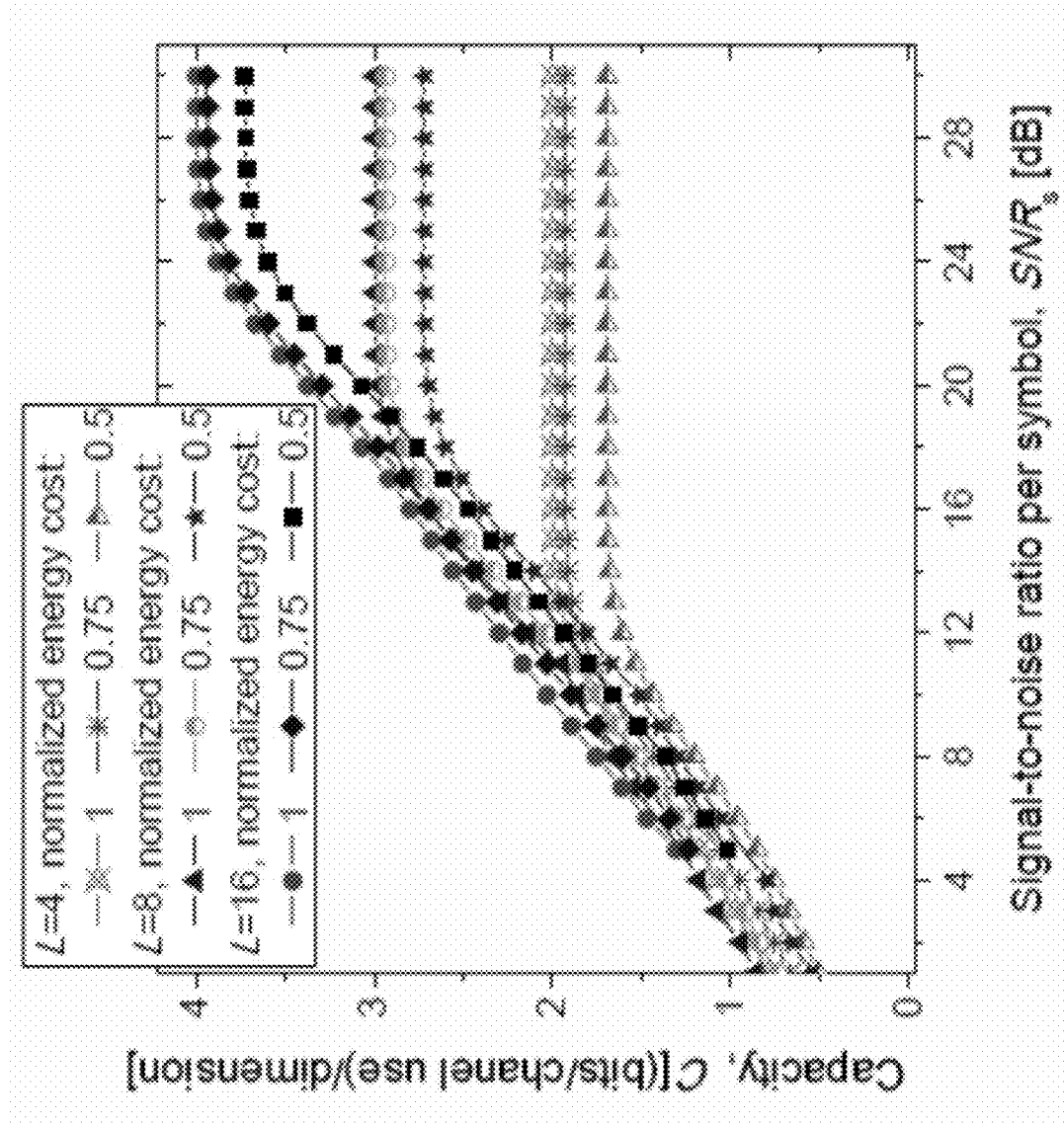
FIG. 1 is a graphical diagram depicting information capacities per dimension wherein I-ary input J-ary output (J>I) channel model is used for channel model, and the inset shows optimum constellation for L=4 and D=1.
Figure 2A:
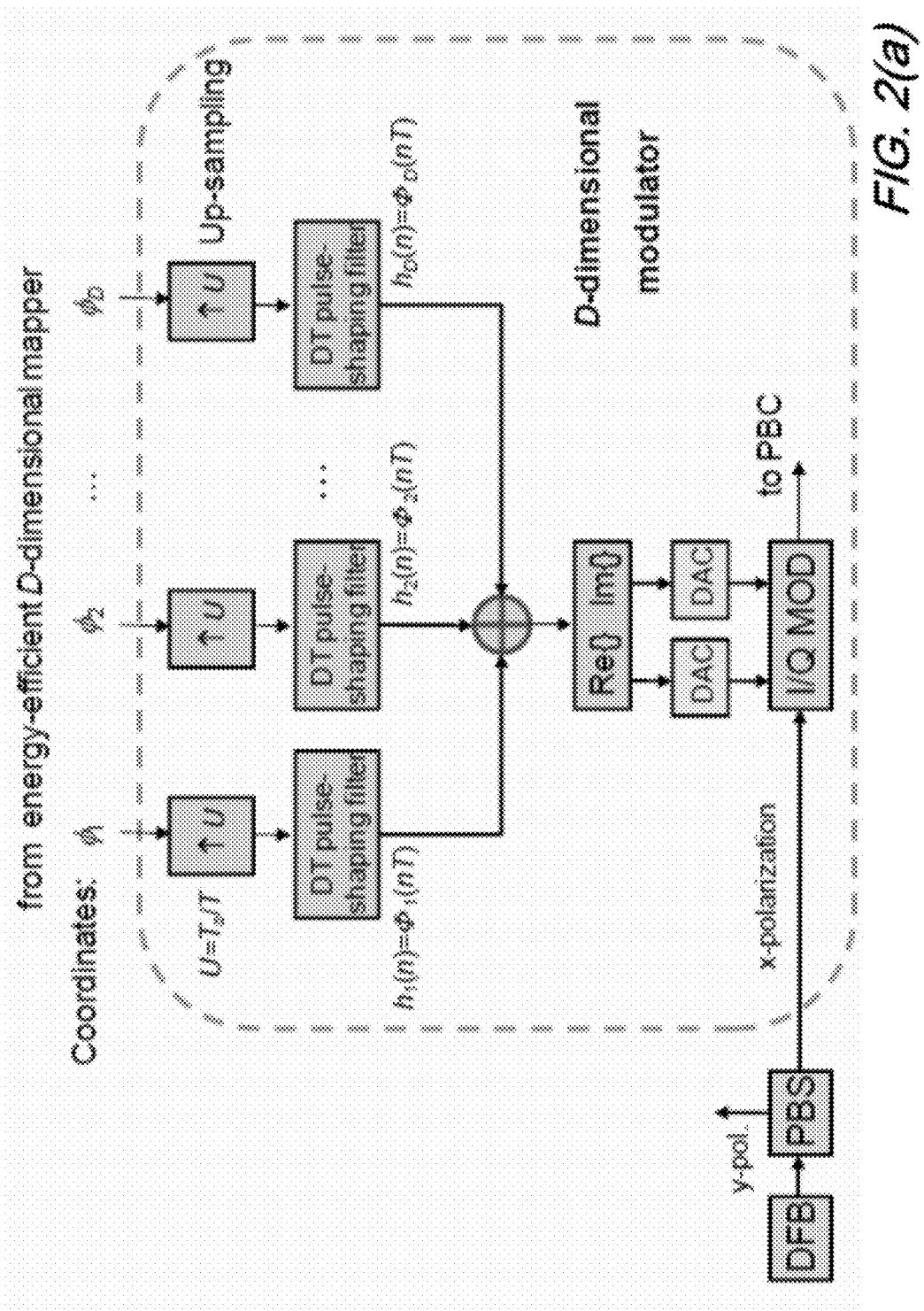
FIG. 2(a)-(d) depicts the overall D-dimensional EE scheme according to an aspect of the present disclosure wherin
Figure 2B:
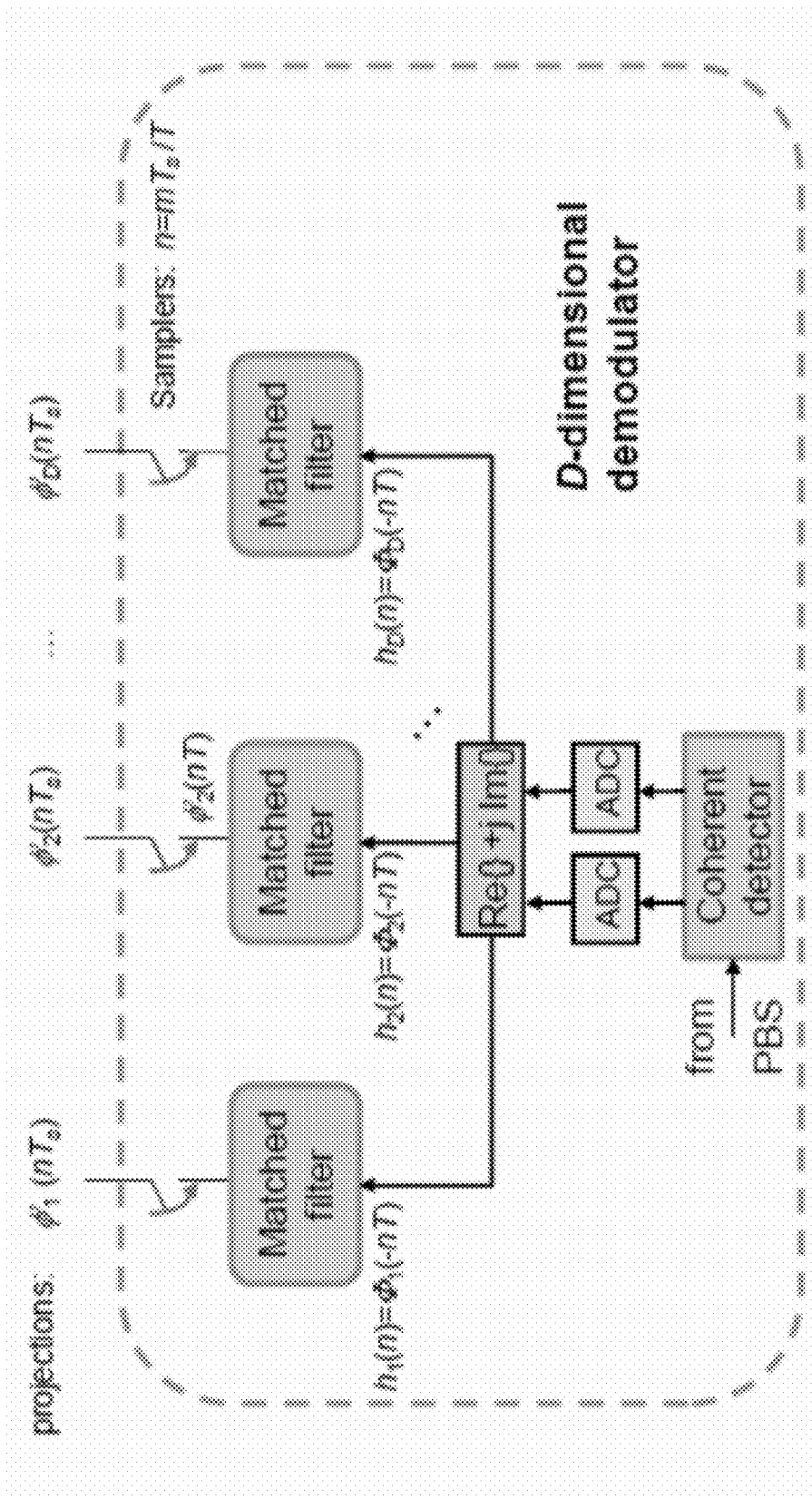
Figure 2C:
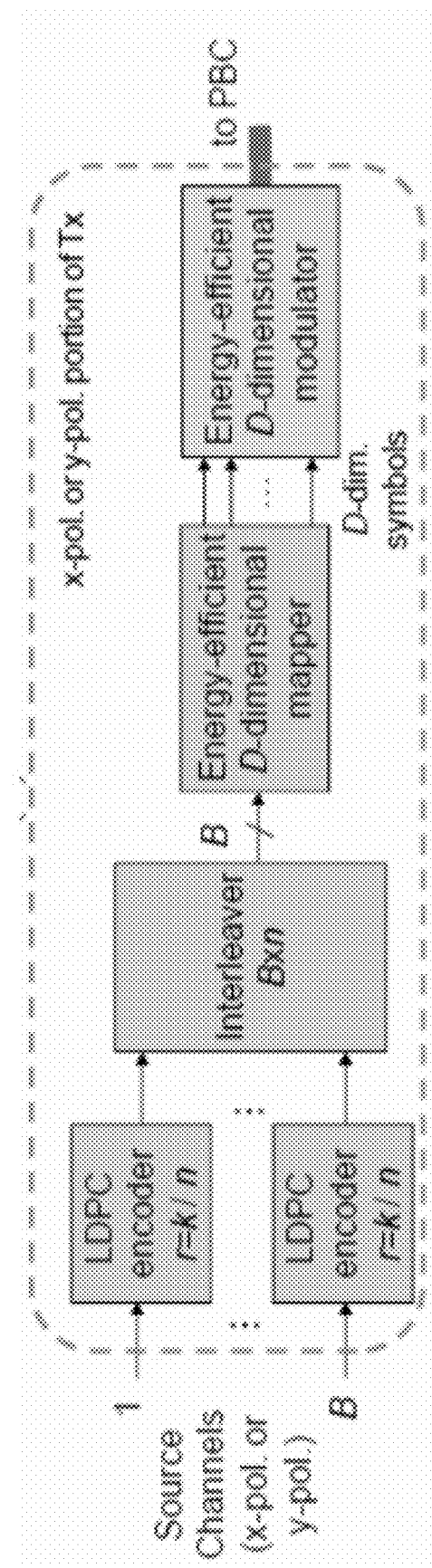
Figure 2D:
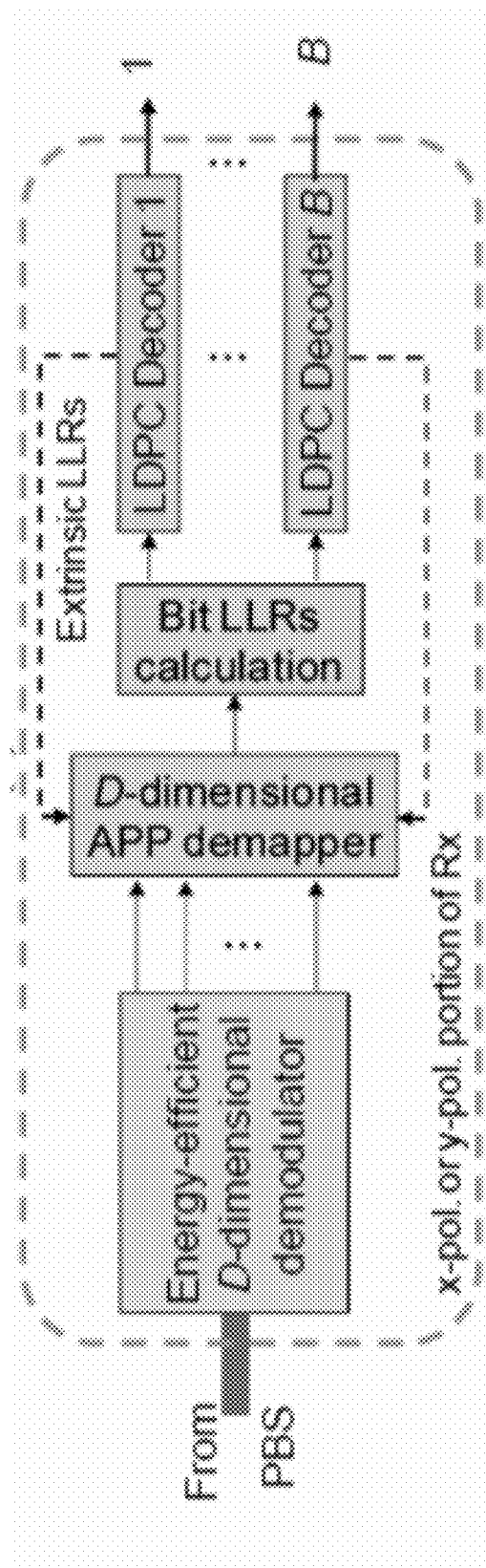

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

By way of some additional background, it is initially noted that prior-art coded modulation schemes for optical communication are largely concerned with high spectral efficiency, while energy-efficiency was not considered as important until recently [See, e.g., X. Liu, T. H. Wood, R. Tkach, and S. Chandrasekhar, "Demonstration of record sensitivity in an optically pre-amplified receiver by combining PDM-QPSK and 16-PPM with pilot-assisted digital coherent detection," which appeared in Optical Fiber Communication Conference, OSA Technical Digest (CD) (Optical Society of America, 2011), paper PDPB1]. As generally described therein, different polarization-division multiplexed (PDM)-QPSK streams are multiplexed together by using different time-slots in an attempt to balance properties of spectrally efficient schemes (such as QAM) and power efficient schemes (such as PPM).

Additional alternatives such as those described by I. B. Djordjevic, M. Arabaci, L. Xu, and T. Wang, in "Spatial-domain-based multidimensional modulation for multi-Tb/s serial optical transmission," which appeared in *Optics Express*, vol. 19, no. 7, pp. 6845-6857, Mar. 28, 2011, may also be considered as an energy-efficient alternative. In this latter article, a spatial-domain-based coded modulation was based on orthogonal OAM modes, which were used as basis functions. As may be appreciated by those skilled in the art however, neither of these schemes considers the energy-efficient optical communication from statistical physics or information theory point of view.

We begin our discussion by noting that an energy efficient (EE) optical communication problem can be formulated as follows.

The set of symbols $X=\{x_1, x_2, \ldots, x_M\}$ that occurs with a priori probabilities $p_1, p_2, \ldots, p_M [p_i = \Pr(x_i), i=1, \ldots, M]$; with corresponding symbol energies $E_1, \ldots, E_M$; are to be transmitted over an optical channel. The prior probabilities satisfy the following probability constraint:

$$\Sigma_i p_i = 1.$$

By interpreting the symbols as states of a thermodynamic system, and their probabilities of occurrence as probabilities of a system being in a particular state $p_i = N_i/N$, where $N_i$ is the number of subsystems being in state $x_i$ and $N = N_1 + \ldots + N_M$; we can advantageously establish a one-to-one correspondence between communications and thermodynamics systems.

The number of states in which a particular set of occupation number $N_i$ occurs is given by the multinomial coefficient, $$C(\{N_i\}) = N!/(N_1! \ldots N_M!).$$

Corresponding thermodynamics entropy is defined by the relationship:

$$S_t = k \log C(\{N_i\}_{i=1}^M) = k \log [N!/(N_1! \ldots N_M!)], \quad (1)$$

where k is the Boltzmann constant.

For convenience, we will use the following definition of thermodynamic entropy namely, $S' = (S_t/k)/N$.

By using Stirling's approximation, given by $\log n! = n \log n - n + O(\log n)$, the normalized thermodynamics entropy, based on (1), becomes:

$$S(X) \approx (N \log N - \Sigma_{i=1}^M N_i \log N_i)/N = -\Sigma_{i=1}^M (N_i/N) \log (N_i/N) = -\Sigma_{i=1}^M p_i \log p_i = H(X). \quad (2)$$

Therefore, Shannon's entropy H(X) is a Stirling's approximation of the normalized thermodynamics entropy S'(X), indicating that different statistical physics energy minimization methods are directly applicable to communication systems.

The received symbols are affected by ASE noise and various channel impairments and distortions including fiber non-linearities, dispersion and filtering effects. The mutual information, or the amount of information transmitted over the channel, can be determined as:

$$I(X,Y) = S'(X) - S'(X|Y),$$

where Y is the output of the channel.

For energy-efficient communication systems, we impose the following energy constraint:

$$\Sigma_i p_i E_i \leq E$$

where E denotes the available energy.

In the absence of ASE noise and channel impairments, $S'(X|Y) = 0$.

In the presence of channel impairments, the maximization of equation (1), leads to the maximum mutual information, also known as information capacity, and can be performed by using the Lagrangian method:

$$L_m = S(X) - S(X|Y) + \alpha(1 - \Sigma_i p_i) + \beta(E - \Sigma_i p_i E_i) \quad (3a)$$

$$\cong H(X) - H(X|Y) + \alpha(1 - \Sigma_i p_i) + \beta(E - \Sigma_i p_i E_i), \quad (3b)$$

where $H(X|Y) = -\Sigma_i p_i \Sigma_j P_{ij} \log Q_{ji}$ and $P_{ij}$ denotes the transition probability $P_{ij} = \Pr(y_j|x_i)$, which can be determined by channel estimation, by propagating sufficiently long training sequence. In (3), with $Q_{ji}$ we denoted the $\Pr(x_i|y_j)$, which can be determined by Bayes' rule: $Q_{ji} = \Pr(x_i|y_j) = \Pr(x_i, y_j)/\Pr(y_j) = P_{ij} p_i / \Sigma_k P_{kj} p_k$. The second term in (3) is the conditional entropy. In the absence of ASE noise and channel impairments, the solution can be found in closed form as $p_i = \exp(-\beta E_i)/\Sigma_j \exp(-\beta E_j)$, which is clearly Gibbs distribution. Note that when the energy constraint is removed, by setting $\beta = 0$, the Gibbs distribution becomes uniform. In the presence of ASE noise and channel impairments, the mutual information optimization problem, with respect to input distribution and corresponding signal constellation, cannot be solved analytically. However, we can use the following algorithm, which we will refer to as the energy-efficient signal-constellation design algorithm (EE-SCDA):

1. Initialization: Choose an arbitrary auxiliary input distribution and signal constellation, with a number of constellation points $M_\alpha$ much larger that the target signal constellation M.
2. $Q_{ji}$ update-rule: $Q_{ji}^{(t)} = P_{ij} p_i^{(t)} / \Sigma_k P_{kj} p_k^{(t)}$. (With superscript (t) we denoted the index of iteration.)
3. $p_i$ update-rule: $p_i^{(t+1)} = e^{-\beta E_i - S^{(t)}(x_i|Y)} / \Sigma_k e^{-\beta E_k - S^{(t)}(x_k|Y)}$, where the Lagrange multiplier $\beta$ is determined from energy constraint.
4. Signal constellation design: Determine the constellation points of target constellation as a center of mass of the closest $M_\alpha/M$ constellation points in the auxiliary signal constellation as follows:

$$s_i^{(t)} = \Sigma_{j \in n(i)} p_j^{(t)} s_{a,j}^{(t)},$$

where $s_i^{(t)}$ is i-th target signal constellation point. The $s_{a,j}^{(t)}$ denotes j-th auxiliary signal constellation point in the neighborhood of $s_i$, denoted as n(i).

Note that Step (1) above is based on Bayes' rule. Step (2) above can be interpreted as being derived from Gibbs distribution by introducing the correction factor, which is the conditional entropy originating from channel impairments and noise.

Notice further that an "original" Arimoto-Blahut algorithm [See, e.g., R. E. Blahut, "Computation of channel capacity and rate distortion functions," *IEEE Trans. Inform. Theory*, vol. IT-18, pp. 460-473, 1972] does not impose the energy constraint and yields to the optimum source distribution only. Advantageously, through the use of our EE-SCDA, we obtain the optimized signal constellation by taking the energy constraint into account. Of further advantage, both the optimum source distribution and the energy-efficient signal constellation are obtained as the result of the method according to the present disclosure.

We note at this point that 2D-constellation design has been discussed by others [See, e.g., G. Foschini, R. Gitlin, and S. Weinstein, IEEE Trans. Comm. 22, 28 (1974)], however, the signal constellation produced therein is designed to minimize the symbol error probability. Still another approach, discussed in the context of multimode fibers, is information theory based signal constellation design, which represents the special case of statistical physics inspired SCDA [See, e.g., I. B. Djordjevic, Opt. Express 19, 16708-16714 (2011).

With reference now to FIG. 1 there is shown a graph depicting various informational capacities that are normalized per dimension for different normalized energy cost functions, defined as $E/E_s$, where $E_s$ is the average symbol energy of a given constellation and E is the energy used in equation (3). A number of amplitude levels per dimension, denoted by L, is used as a parameter.

It is evident that when the normalized energy cost function is lower than one, information capacity degradation is taking place. Namely, in applications when the battery energy source is used, such as deep-space optical and sensor applications, the average signal constellation energy can be higher than the available energy, and in that case we have to reduce the signal constellation size, in accordance with FIG. 1. Notably, in FIG. 1, we use I-ary input J-ary output (J>I) channel model for channel model, which is a valid model for reasonably high signal-to-noise ratios. The inset figure shows optimum constellation for L=4 and D=1.

Turning now again to the energy efficient modulation that is the subject of the present disclosure we note with reference to FIG. 2(*a*) that shows a DT D-dimensional modulator according to an aspect of the present disclosure. The coordinates of the EE signal constellation, stored in a look-up table (LUT—not specifically shown), are used as the inputs to the D-dimensional modulator, whose discrete-time (DT) implementation is shown. The DT D-dimensional modulator generates the signal constellation point according to the following:

$$s_i = C_D \sum_{m=1}^{D} f_{im} \Phi_m, \quad (4)$$

where $\phi_{im}$ denotes the m-th coordinate (m=1, ..., D) of the ith signal-constellation point, the set $\{\Phi_1, \ldots, \Phi_D\}$ represents the set of D orthogonal basis functions, such as orthogonal subcarriers and various classes of orthogonal polynomials, and $C_D$ denotes a normalization factor.

As an alternative solution, discussed by the inventors of the instant application (See, e.g., I. B. Djordjevic, Opt. Express, 19, 16708-16714, 2011), one may use two orthogonal polarization states, in-phase and quadrature components, and orbital angular momentum (OAM) states (in few-mode fibers) as basis functions. One key difference with respect to the present disclosure wherein the D-dimensional constellation is generated in electrical domain, whereas in the prior disclosure by the present inventor both electrical and optical basis functions are employed.

The signal-constellation point coordinates after up-sampling are passed through corresponding DT pulse-shaping filters of impulse responses $h_m(n)=\Phi_m(nT)$, whose outputs are combined together into a single complex data stream. After separation of real and imaginary parts and digital-to-analog conversion (DAC), the corresponding real and imaginary parts are used as inputs to the I/Q modulator. Two I/Q modulators are used for two orthogonal polarizations.

A D-dimensional demodulator according to the present disclosure is shown in FIG. 2(*b*). With reference to that FIG. 2(*b*) it may be observed that after separation of two D-dimensional data streams carried in two polarizations by PBS, a coherent detection is performed thereby recovering Re-(al) and Im-(aginary) parts, which are—after analog-to-digital conversion (ADC)—combined into a single complex data stream. The same complex data stream is applied to the inputs of D matched filters of impulse responses $h_m(n)=\Phi_m(nT)$. The corresponding outputs after re-sampling (see FIG. 2(*b*)) represent projections along basis functions $\Phi_m$.

An overall transmitter architecture according to the present disclosure is shown in FIG. 2(*c*). The B binary data streams per single polarization are encoded using B (n,k) LDPC codes. The codewords generated by LDPC encoders are written row-wise into a corresponding block-interleaver. The B bits at time instance i are taken from block-interleaver column-wise and used as the input of corresponding D-dimensional mapper, implemented as a look-up table, which passes coordinates to the D-dimensional modulator (see FIG. 2*a*).

A receiver architecture per single polarization is depicted in FIG. 2(*d*). The D-dimensional signal constellation point, transmitted over a given polarization, is reconstructed in D-dimensional demodulator (see FIG. 2*b*), which provides projections along basis functions. The reconstructed coordinates are used as input to D-dimensional α posteriori probability (APP) demapper, which calculates symbol log-likelihood ratios (LLRs). The spectral efficiency of this EE scheme is $D \log_2 L / \log_2 M_{QAM}$ times better than that of PDM-QAM, where L is the number of amplitude levels per dimension and $M_{QAM}$ is QAM signal-constellation size.

Figure 3:
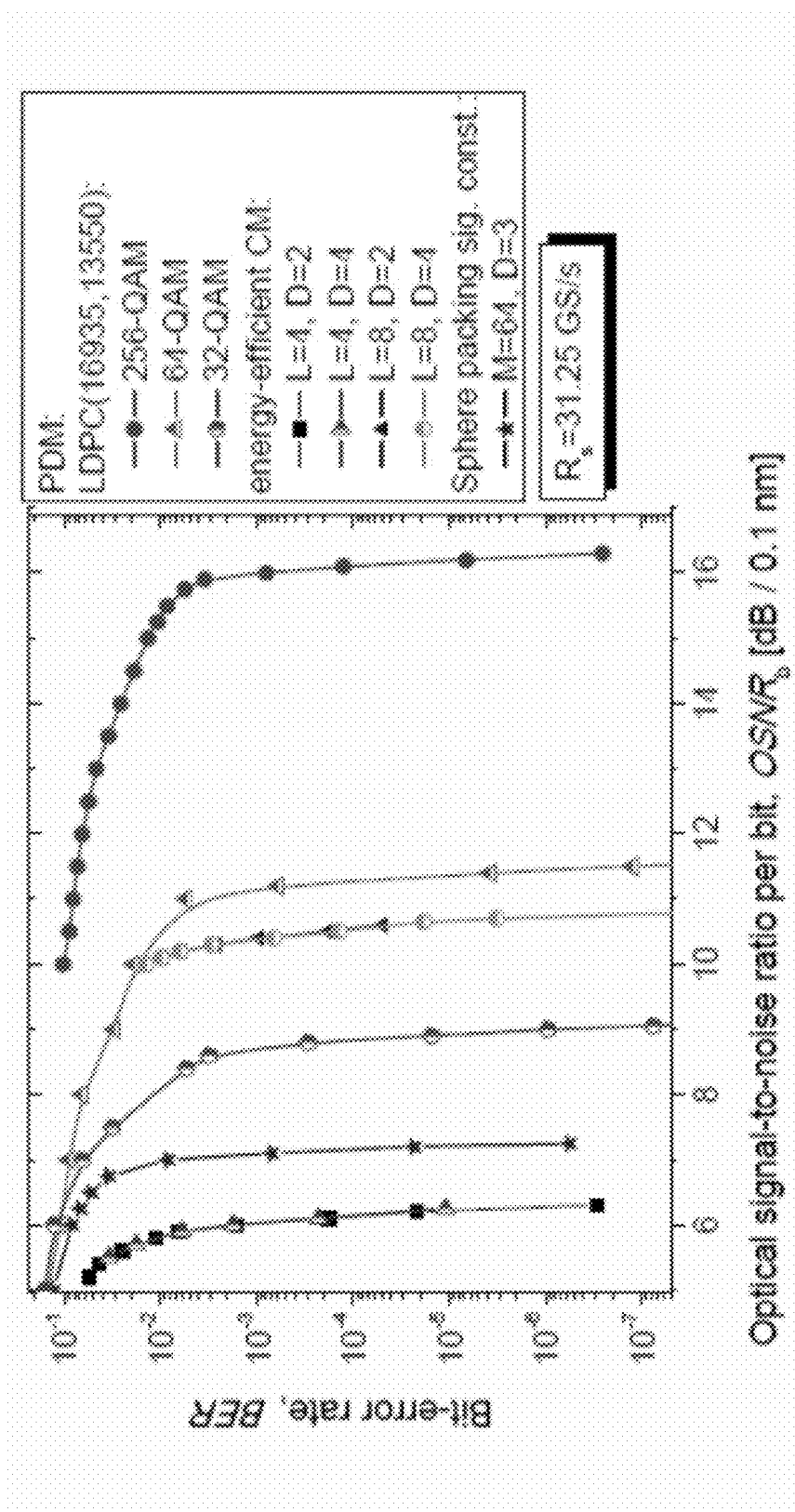
FIG. 3 is a graph showing the BER performance of EE-PDM LDPC coded modulation according to an aspect of the present disclosure wherein a given CIPQ signal constellation is obtained by placing one point in the origin and then running the IPQ procedure. The inset figure shows optimum 8-ary constellation for D=2.

In order to illustrate the high potential of our energy-efficient coded-modulation according to the present disclosure, we perform Monte Carlo simulations for ASE noise dominated scenario, with results summarized in FIG. 3. This scenario is applicable fiber-optics communications when the coarse digital back propagation is combined with sliding-window turbo equalization scheme, as we described in a previous paper (See, e.g., H. G. Batshon, I. B. Djordjevic, L. Xu, and T. Wang, IEEE Photon. Journal, 2, 593-599 (2010)). We compare BER performance of EE-PDM (16935,13550) LDPC-coded modulation (CM) against that of PDM-QAM, and previous IPQ-based signal constellation.

It is clear that for fixed L, the increase in the number of dimensions leads to small performance degradation as long as orthogonality of basis functions is preserved. The aggregate data rate of EE PDM coded-modulation scheme is determined by $2 \times R_s \times \log_2(L^D) \times r$, where $R_s$ is the symbol rate and r is the code rate. The comparisons are performed for fixed bandwidth equal to the symbol rate $R_s$. By setting $R_s$=31.25 Giga symbols/s (GS/s), r=0.8, L=4, and D=4 the aggregate data rate is 400 Gb/s, which is compatible with 400 Gb/s Ethernet. As another example, by setting L=4, D=10, $R_s$=31.25 GS/s, and r=0.8, the aggregate data rate is 1 Tb/s, which is compatible with 1 Tb/s Ethernet. Let us now compare the performance of EE PDM L=4, D=4 coded-modulation with PDM 256-QAM (D=2 in x-pol. and D=2 in y-pol.), having the same number of constellation points. At a BER of $2.5 \times 10^{-7}$, the L=4, D=4 EE-PDM coded modulation scheme outperforms the corresponding PDM 256-QAM by even 9.98 dB. In FIG. 3 we also provide the comparison among proposed EE-SCDA in two-dimensions against conventional QAM and IPQ-based 2D constellations. The 8-ary EE-SCDA outperforms 8-QAM by 0.7 dB at BER of $10^{-8}$. The 16-ary EE-SCDA outperforms 16-QAM by 0.74 dB at BER of $2 \times 10^{-8}$. As the coordinates obtained by EE-SCDA are stored in LUT, the complexity of proposed scheme is comparable to that of PDM-QAM.

While we have shown an described our energy efficient coded modulation method and apparatus using some exemplary embodiments, those skilled in the art will readily realize that our disclosure is not so limited. Accordingly, the disclosure should be viewed as limited only by the scope of the claims that follow.

The invention claimed is:

1. A modulation method comprising the steps of:
   generating an energy efficient signal constellation (EESC) through the effect of an energy efficient Arimoto-Blahut technique;
   applying the coordinates of the EESC to inputs of a D-dimensional modulator such that signal constellation points are generated;
   applying the signal constellation points to pulse shaping filters and combining the outputs of the filters;
   separating the outputs into real and imaginary components; and
   applying the real and imaginary components to a pair of I/Q modulators, one for each polarization of an input signal, such that a modulated output signal is produced.

* * * * *